US006658619B1

(12) United States Patent
Chen (10) Patent No.: US 6,658,619 B1
(45) Date of Patent: Dec. 2, 2003

(54) SYSTEMS AND METHODS FOR IMPLEMENTING HIERARCHICAL ACKNOWLEDGEMENT BITMAPS IN AN ARQ PROTOCOL

(75) Inventor: Dayong Chen, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 457 days.

(21) Appl. No.: 09/679,286

(22) Filed: Oct. 6, 2000

(51) Int. Cl.[7] ............................................... G08C 25/02
(52) U.S. Cl. ...................................................... 714/748
(58) Field of Search .................... 714/748, 18; 370/450, 370/456

(56) References Cited

U.S. PATENT DOCUMENTS

| | | | |
|---|---|---|---|
| 5,974,028 A | 10/1999 | Ramakrishnan | 370/229 |
| 6,212,240 B1 * | 4/2001 | Scheibel, Jr. et al. | 375/261 |
| 6,317,430 B1 * | 11/2001 | Knisely et al. | 370/394 |
| 6,367,045 B1 * | 4/2002 | Khan et al. | 714/748 |

OTHER PUBLICATIONS

Balachandran, Krishna; Ejzak, Richard P.; and Nanda, Sanjiv: "Efficient Transmission Of ARQ Feedback For EGPRS Radio Link Control," VTC 1999–Fall, IEEE VTS 50th, Vehicular Technology Conference, Gateway to the 21st Century Communications Village, Amsterdam, Sep. 19–22, 1999, IEEE Vehicular Technology Conference, New York, New York: IEEE, US, vol. 3, Conf. 50, Sep. 19, 1999, pp. 1663–1669.

* cited by examiner

Primary Examiner—Phung M. Chung
Assistant Examiner—Shelly A Chase
(74) Attorney, Agent, or Firm—Coats & Bennett, P.L.L.C.

(57) ABSTRACT

A communication device includes a processing unit and a transmitter. The processing unit specifies a number of data blocks in an ARQ receive window and divides the receive window into a number of sectors, each sector having a portion of the number of data blocks in the receive window. The processing unit further receives data blocks within the receive window transmitted from a transmitting communication device and constructs an acknowledgement bitmap for each sector in the receive window. The acknowledgement bitmap includes a sector acknowledgement bit. The transmitter transmits the acknowledgement bitmap for each sector to the transmitting communication device.

45 Claims, 6 Drawing Sheets

SYSTEMS AND METHODS FOR IMPLEMENTING HIERARCHICAL ACKNOWLEDGEMENT BITMAPS IN AN ARQ PROTOCOL

BACKGROUND OF THE INVENTION

The present invention relates generally to automatic-repeat-request (ARQ) transmission protocols in communications systems and, more particularly, to systems and methods for implementing hierarchical acknowledgement bitmaps in ARQ transmission protocols.

In communication systems employing conventional ARQ protocols, such as, for example, sliding window ARQ, a transmitting device can transmit up to N blocks of data (where N equals the send window size) before receiving any acknowledgement (ACK) messages from a receiving device. As is known in the art, a large sliding window advantageously increases channel utilization and data throughput. The receiving device may acknowledge data blocks received from the transmitting device using a conventional flat bitmap. In such a flat bitmap, one bit, called an acknowledge/negative acknowledge (ACK/NACK) bit, is used to acknowledge or negative acknowledge each individual data block in the receive window. The ACK/NACK bit is set to "1" if a corresponding block has been received. Otherwise, the ACK/NACK bit is set to "0".

Conventionally, the receiving device includes the flat bitmap in a separate ACK/NACK message and sends the message to the transmitting device on a return channel to acknowledge receipt of the data blocks sent by the transmitting device. The receiving device may also piggyback the bitmap in a header of any data block it sends to the transmitting device. The efficient transmission of acknowledgement bitmaps by the receiving device is an important issue if a large window size is used because the conventional flat bitmap may not fit into a single ACK/NACK message.

The receiving device can divide a long flat bitmap into several partial bitmaps and then send the partial bitmaps using several transmissions. If a partial bitmap is corrupted, however, the transmitting device must wait longer until it can advance its send window since the send window cannot be advanced until the partial bitmap is received. This delay causes the send window to stall and, thus, the transmitting device cannot transmit any new data blocks. Protocol stalling can be a performance limiting factor in an ARQ protocol (e.g., RLC protocol in Enhanced General Packet Radio Service (EGPRS)) with a large window size and having a long round-trip delay.

To overcome the inefficiency of the flat bitmap, the EGPRS protocol, for example, uses a one-dimensional run length coding (based on ITU-T T.4) to compress the bitmap. The T.4 procedure for encoding run lengths, however, can achieve bitmap compression only if, on average, the run lengths are longer than corresponding code words. In many cases, the flat bitmap cannot be compressed, or even worse, the compressed bitmap requires more bits than the flat bitmap.

BRIEF SUMMARY OF THE INVENTION

In accordance with the purpose of the invention as embodied and broadly described herein, a method for communicating data between a transmitting communication device and a receiving communication device includes specifying a number of data blocks in an ARQ receive window; dividing the receive window into a number of sectors, each sector comprising a portion of the number of data blocks in the receive window; receiving, at the receiving communication device, data blocks within the receive window transmitted from the transmitting communication device; constructing an acknowledgement bitmap for each sector in the receive window, the acknowledgement bitmap comprising a sector acknowledgement bit; and transmitting the hierarchical acknowledgement bitmap for each sector to the transmitting communication device.

In another implementation consistent with the present invention, a method for constructing an acknowledgment message in a communication device includes dividing an ARQ receive window into a number of sectors, each sector comprising a portion of a number of data blocks in the receive window; receiving data blocks within the ARQ receive window; and constructing an acknowledgement bitmap for each sector in the receive window, the acknowledgement bitmap comprising a sector acknowledgement bit.

In a further implementation consistent with the present invention, a data structure encoded on a computer readable medium includes acknowledgement data for acknowledging data blocks received in each sector of an ARQ receive window, each sector comprising a portion of a number of data blocks in the receive window, the acknowledgement data comprising a sector acknowledgement bit.

In an additional implementation consistent with the present invention, a method of compressing an acknowledgement bitmap used in an ARQ protocol includes selecting a size for each sector in an ARQ receive window, each sector comprising a portion of a number of data blocks in the receive window; constructing a hierarchical acknowledgement bitmap for each sector in the receive window, the hierarchical acknowledgement bitmap comprising a sector acknowledgement bit; determining a bit compression of a total acknowledgement bitmap comprising the hierarchical bitmaps for each sector in the receive window; and if the bit compression of the total acknowledgement bitmap is not sufficient, re-selecting the size for each sector of the receive window.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the if invention is defined by the appended claims.

Systems and methods consistent with the present invention provide mechanisms that can achieve acknowledgement bitmap compression under most channel conditions. Bitmap compression can be achieved in the present invention by collectively acknowledging/negative acknowledging consecutive blocks having the same receive status in an ARQ window.

Figure 1:
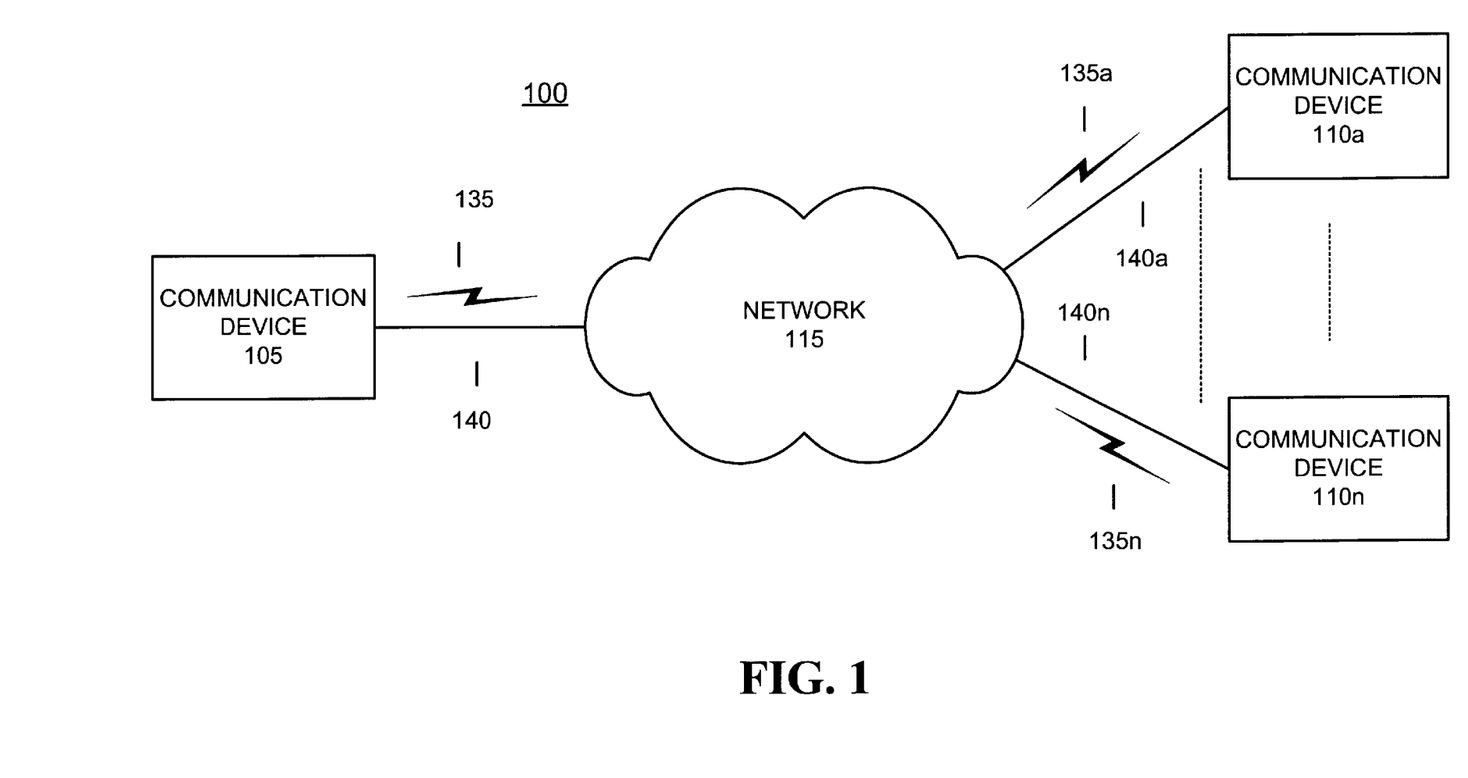
FIG. 1 illustrates an exemplary system in which a system and method, consistent with the present invention, may be implemented.

FIG. 1 illustrates an exemplary system 100 consistent with the present invention. System 100 may include communication device 105 connected with communication devices 110a through 110n via network 115, using wired (140), wireless (135) or optical connection links (not shown). Network 115 may include one or more networks utilizing any type of multi-access media, including a local area network (LAN), a metropolitan area network (MAN), a satellite network, a bidirectional cable TV network, or a cellular telephone network.

Communication devices 105 and 110a–110n may be similarly constructed and may include telephones, cellular radiotelephones (with or without a multi-line display), Personal Communications System (PCS) terminals, or the like. PCS terminals may combine a cellular radiotelephone with data processing, facsimile and data communications capabilities. Communication devices 105 and 110a–110n may further include personal digital assistants (PDAs), conventional laptop and/or palmtop receiver, or other appliances that include radiotelephone transceivers, or the like. PDAs may include radiotelephones, pagers, Internet/intranet access, web browsers, organizers, calendars and/or global positioning system (GPS) receivers. Communication devices 105 and 110a–110n may further be referred to as "pervasive computing" devices.

Figure 2:
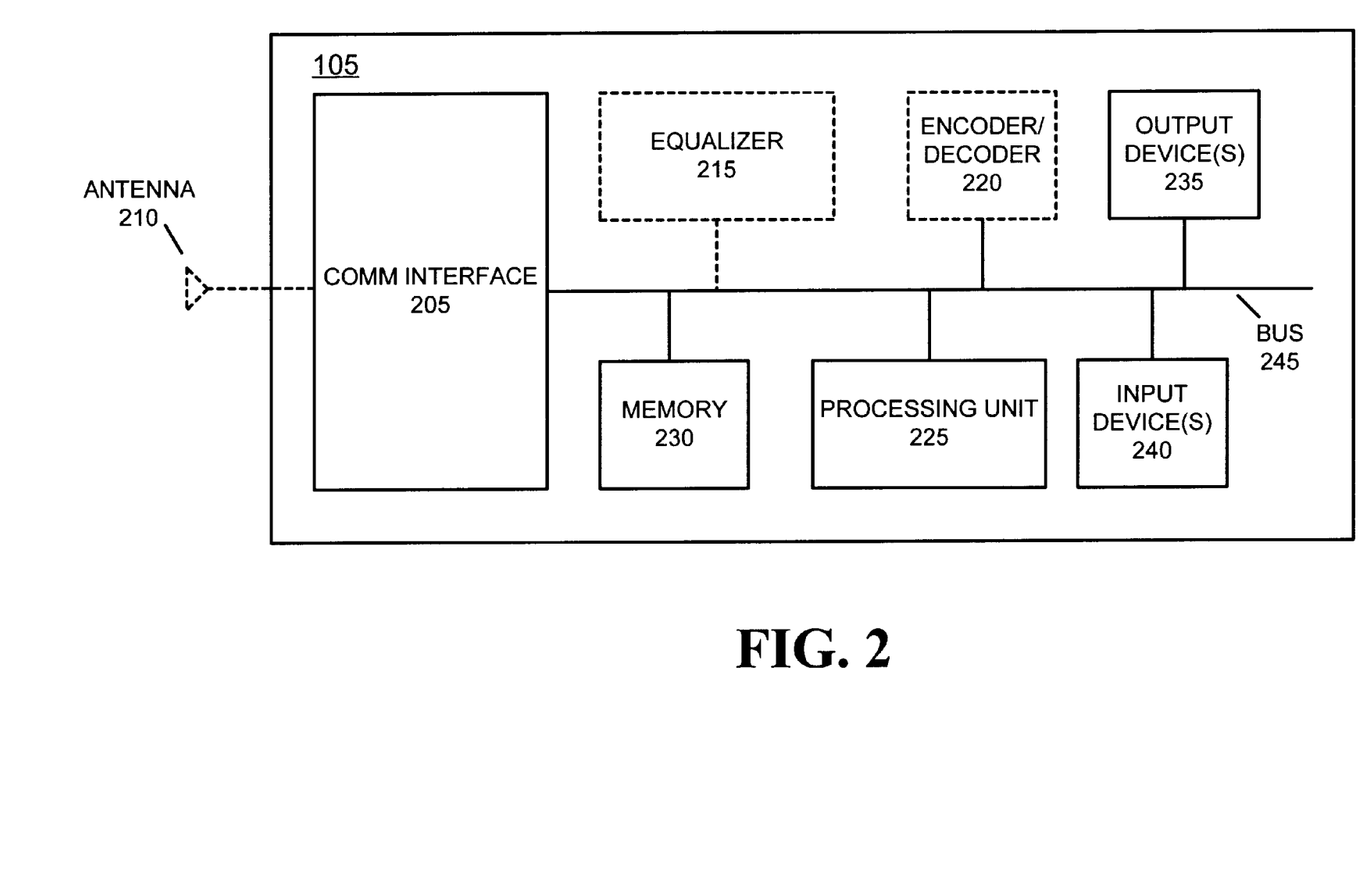
FIG. 2 illustrates an exemplary communication device consistent with the present invention.

FIG. 2 illustrates an exemplary communication device 105 consistent with the present invention. Communication device 105 may include a communication interface 205, an optional antenna 210, an optional equalizer 215, an optional encoder/decoder 220, a processing unit 225, a memory 230, output device(s) 235, input device(s) 240, and a bus 245.

Communication interface 205 may connect communication device 105 to another device or network, such as network 115. For example, communication interface 205 may include transceiver circuitry well known to one skilled in the art for transmitting and/or receiving data bursts in a network, such as network 115, via antenna 210.

Equalizer 215 may store and implement conventional Viterbi trellises for estimating received symbol sequences using, for example, a conventional maximum likelihood sequence estimation technique. Equalizer 215 may additionally include conventional mechanisms for performing channel estimation.

Encoder/decoder 220 may include conventional circuitry for decoding and/or encoding received or transmitted symbol sequences.

Processing unit 225 may perform all data processing functions for inputting, outputting, and processing of data including data buffering and device control functions, such as call processing control, user interface control or the like.

Memory 230 provides permanent, semi-permanent, or temporary working storage of data and instructions for use by processing unit 225 in performing processing functions. Memory 230 may include large-capacity storage devices, such as a magnetic and/or optical recording medium and its corresponding drive.

Output device(s) 235 may include conventional mechanisms for outputting data in video, audio, and/or hard copy format. Input device(s) 240 permit entry of data into communication device and may include a user interface and a microphone (not shown). The microphone can include conventional mechanisms for converting auditory input into electrical signals.

Bus 245 interconnects the various components of communication device 105 to permit the components to communicate with one another.

The configuration of components of communication device 105 illustrated in FIG. 2 is for illustrative purposes only. One skilled in the art will recognize that other configurations may be implemented.

Figure 3:
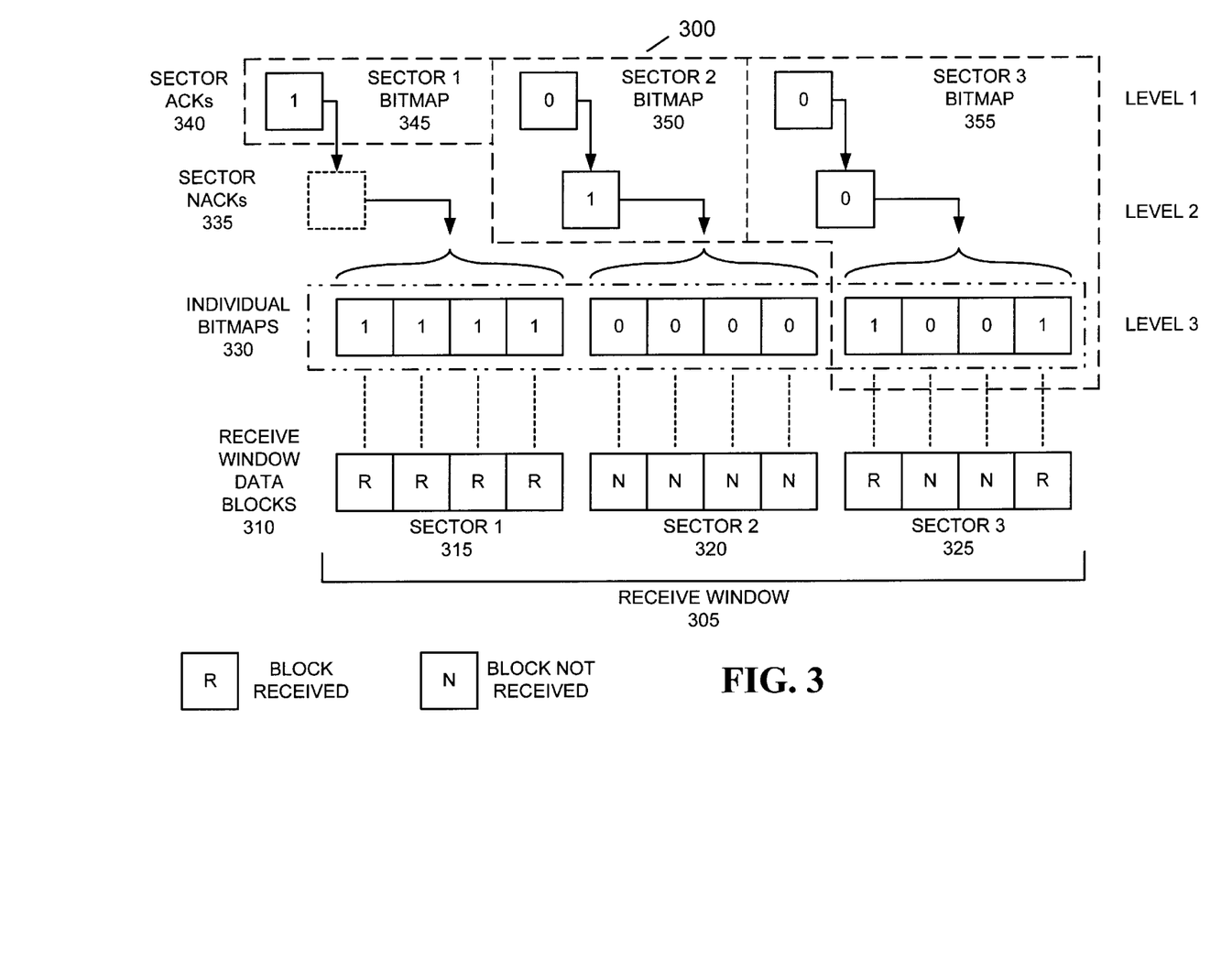
FIG. 3 illustrates an exemplary hierarchical acknowledgement bitmap consistent with the present invention.

FIG. 3 illustrates an exemplary hierarchical bitmap 300, consistent with the present invention, for implementation in a sliding window Automatic-Repeat-Request (ARQ) protocol. The exemplary hierarchical bitmap 300 may be used to reduce the size of the bitmap transmitted from a receiving device to a transmitting device when a receive window is large. As shown in FIG. 3, a receive window 305 of the sliding window ARQ may comprise n sectors of receive window data blocks 310, where sector 1 315, sector 2 320, and sector 3 325 are shown for illustrative purposes. Each sector may further include a fixed number C of blocks of data (C=4 shown for purposes of illustration).

Hierarchical bitmap 300 includes sector bitmaps, one sector bitmap for each sector in receive window 305 (three sector bitmaps shown in FIG. 3 for illustrative purposes). Each sector bitmap may include a level 1 sector ACK bit 340, a level 2 sector NACK bit 335 and/or a level 3 individual bitmap 330. An individual bitmap 330 can be associated with each sector and includes C bits, one bit for each block of the sector. If a particular block in a sector has been received (R), then the associated bit in the individual bitmap 330 can be set to "1". If a particular block in a sector has not been received (N), then the associated bit can be set to "0". As an example of sector bitmaps in a receive window, FIG. 3 illustrates sector 1 bitmap 345 as including a sector ACK bit; sector 2 bitmap 350 as including a sector ACK bit and a sector NACK bit; and sector 3 bitmap 355 as including a sector ACK bit, sector NACK bit, and an individual bitmap for each data block of the sector.

A sector ACK bit 340 specifies whether the data blocks of an entire sector can be collectively acknowledged. That is, if all data blocks of a sector have been received, then the sector ACK bit 340 for that sector can be set to "1". Furthermore, the sector negative acknowledgement bit (NACK) 335 may not be needed if all data blocks of a sector have been received. Also, the individual bitmap 330 for a sector may not be needed if all data blocks of the sector have been received. For example, all blocks of sector 1 315 have been received, as indicated by "R" in FIG. 3, and the corresponding sector ACK 340 can be set to "1". Neither the sector NACK bit 335 or the individual bitmap 330 for sector 1 315 would be used in the hierarchical bitmap 300.

If all of the blocks of a sector have not been received, then the sector ACK bit 340 for that sector can be set to "0". Furthermore, if none of the data blocks in a particular sector have been received, then the sector NACK bit 335 associated with the particular sector can be set to "1". In this instance, the individual bitmap 330 for the particular sector may not be needed. For example, none of the data blocks of sector 2 320 have been received, as indicated by "N" in FIG. 3, and the sector ACK bit 340 of sector 2 is set to "0" and the sector NACK bit 335 of sector 2 is set to "1". The individual bitmap 330 for sector 2 320 would not be used in the hierarchical bitmap 300.

If some of the data blocks of a sector have been received, but there is at least one block that has not been received in that sector, then both the sector ACK bit 340 and the sector NACK bit 335 for that sector can be set to "0". Additionally, the individual bitmap for that sector can be constructed for the sector and included in the hierarchical bitmap 300. For example, the first and fourth data blocks of sector 3 325 have been received while the second and third data blocks of sector 3 325 have not been received, as indicated by "R" and "N" in FIG. 3. Therefore, the sector ACK bit 340, sector NACK bit 335, and the individual bitmap of sector 3 325 are included in the hierarchical bitmap 300.

Figure 4:
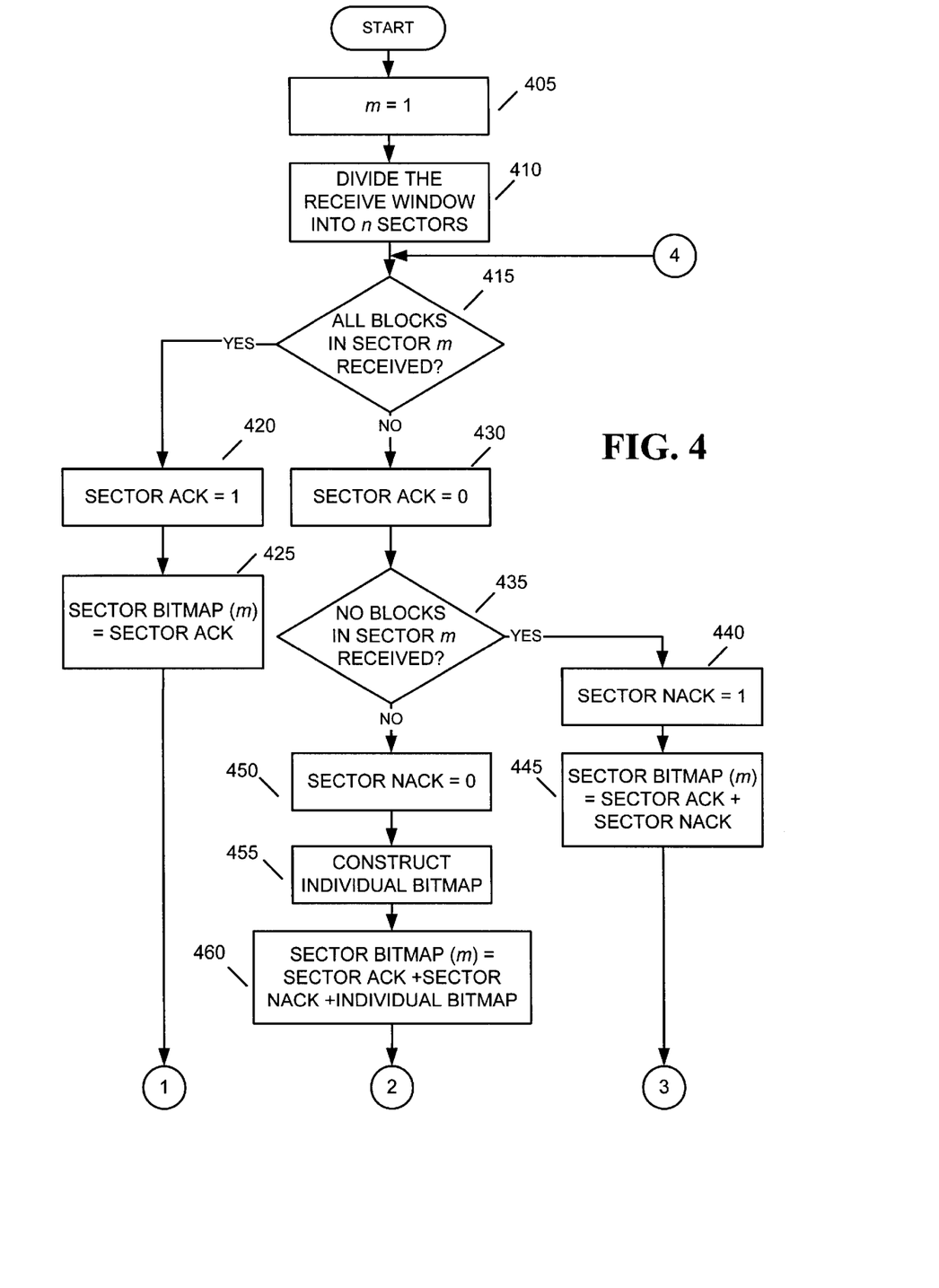
FIGS. 4–5 are flowcharts that illustrate exemplary ARQ processing consistent with the present invention.
Figure 5:
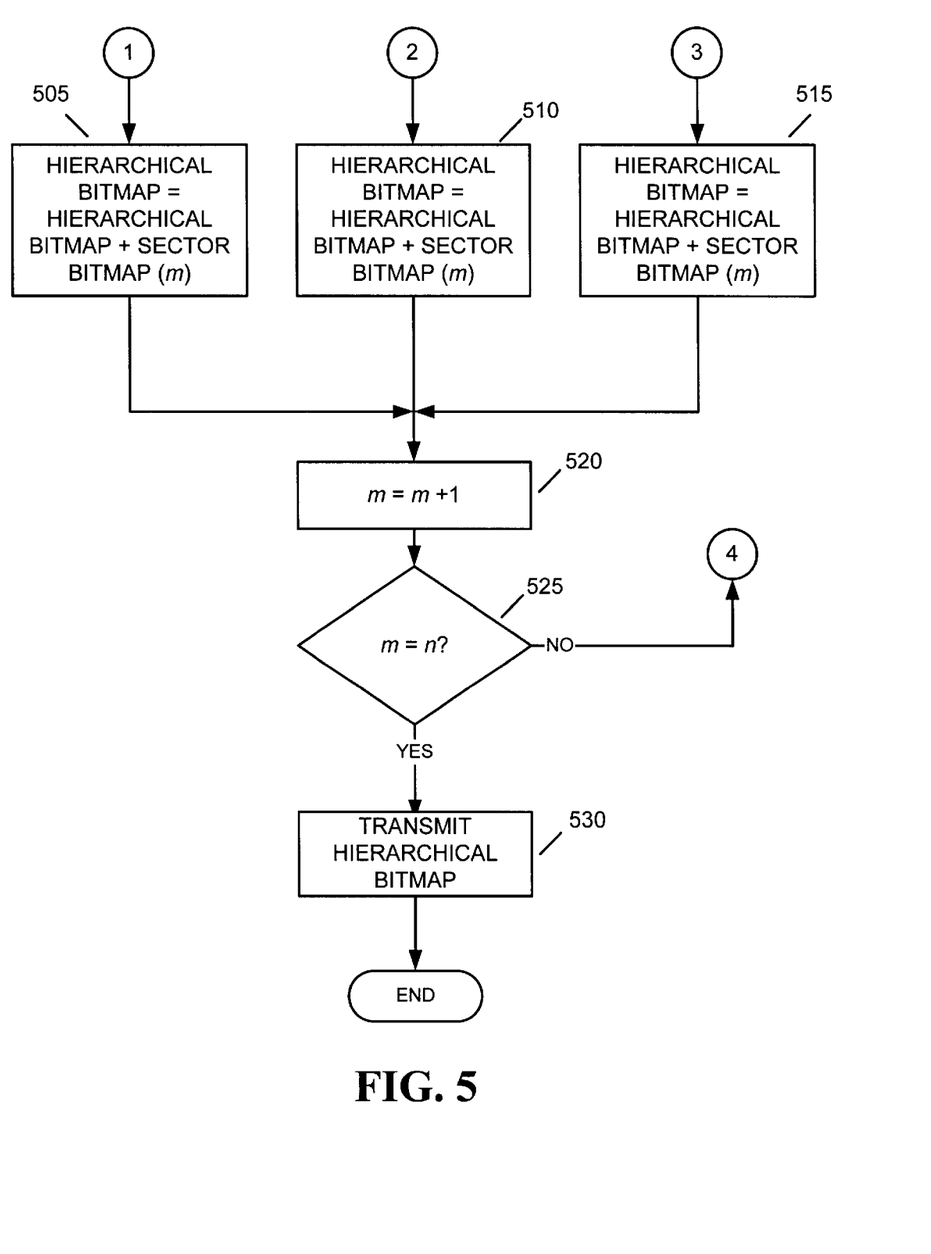

FIGS. 4–5 illustrate exemplary processing, consistent with the present invention, for implementing an ARQ protocol at communication device 105 using hierarchical acknowledgement bitmaps. As one skilled in the art will appreciate, the process exemplified by FIGS. 4–5 may be implemented as a sequence of instructions and stored in memory 230 of communication device 105 for execution by processing unit 225. Alternatively, the process may be implemented in hardware or in any combination of hardware and software. The exemplary processing illustrated in FIGS. 4–5 describes the reception of data blocks at communication device 105 transmitted from, for example, communication device 110a.

Prior to the start of building a hierarchical bitmap, processing unit 225 of communication device 105 initiates an empty hierarchical bitmap in memory 230 and sets a sector index m to 1 [step 405]. Processing unit 225 then can divide the data blocks in the current receive window into n sectors, with each sector consisting of C data blocks [step 410]. Processing unit 225 can then build a hierarchical bitmap by processing one sector at a time in accordance with the following processing steps.

Processing unit 225 determines if all data blocks in sector m have been received from, for example, communication device 110a [step 415]. If so, processing unit 225 sets a sector ACK bit 340 to "1" [step 420] and specifies the bit(s) of a sector bitmap for sector m as comprising the sector ACK bit [step 425]. At step 505 (FIG. 5), processing unit 225 can append the sector bitmap of sector m to the hierarchical bitmap and store the hierarchical bitmap in memory 230 of communication device 105. If processing unit 225 determines in step 415 that not all of the data blocks of sector m have been received, then it can set the sector ACK bit 340 to "0" [step 430].

Subsequent to step 430, processing unit 225 may determine if none of the data blocks of sector m have been received [step 435]. If no data blocks have been received, processing unit 225 may set the sector NACK bit 335 to "1" [step 440] and specify the sector bitmap of sector m as comprising the sector ACK bit 340 and the sector NACK bit 335 [step 445]. At step 515 (FIG. 5), processing unit 225 can append the sector bitmap of sector m to the hierarchical bitmap and store the hierarchical bitmap in memory 230 of communication device 105.

If processing unit 225 determines in step 435 that some of the data blocks of sector m have been received, but at least one data block of sector m has not been received, then processing unit 225 can set the sector NACK bit to "0" [step 450]. Processing unit 225 then can construct an individual bitmap 330 for all data blocks of sector m starting from the first data block of sector m [step 455]. To construct an individual bit amp 330 for sector m, an individual ACK bit can be set to "1" for each data block of sector m that has been received. Furthermore, an individual ACK bit can be set to "0" for each data block of sector m that has not been received. After an individual bitmap has been constructed for sector m, processing unit 225 can specify the sector bitmap of sector m as comprising the sector ACK bit, the sector NACK bit and the constructed individual bitmap [step 460]. At step 510 (FIG. 5), processing unit 225 can append the sector bitmap of sector m to the hierarchical bitmap and store the hierarchical bitmap in memory 230 of communication device 105.

After processing unit 225 finishes the sector designated by the current sector index m, processing unit 225 proceeds to a next sector by incrementing sector index m by 1 [step 520]. Processing unit 225 can then determine if sector index m is equal to the number of sectors n in the receive window [step 525]. If not, processing returns to step 415. If m=n, then processing unit 225 passes the bits of the hierarchical bitmap, together with other possible information, to communication interface 205 for transmission to, for example, communication device 110a [step 530].

Figure 6:
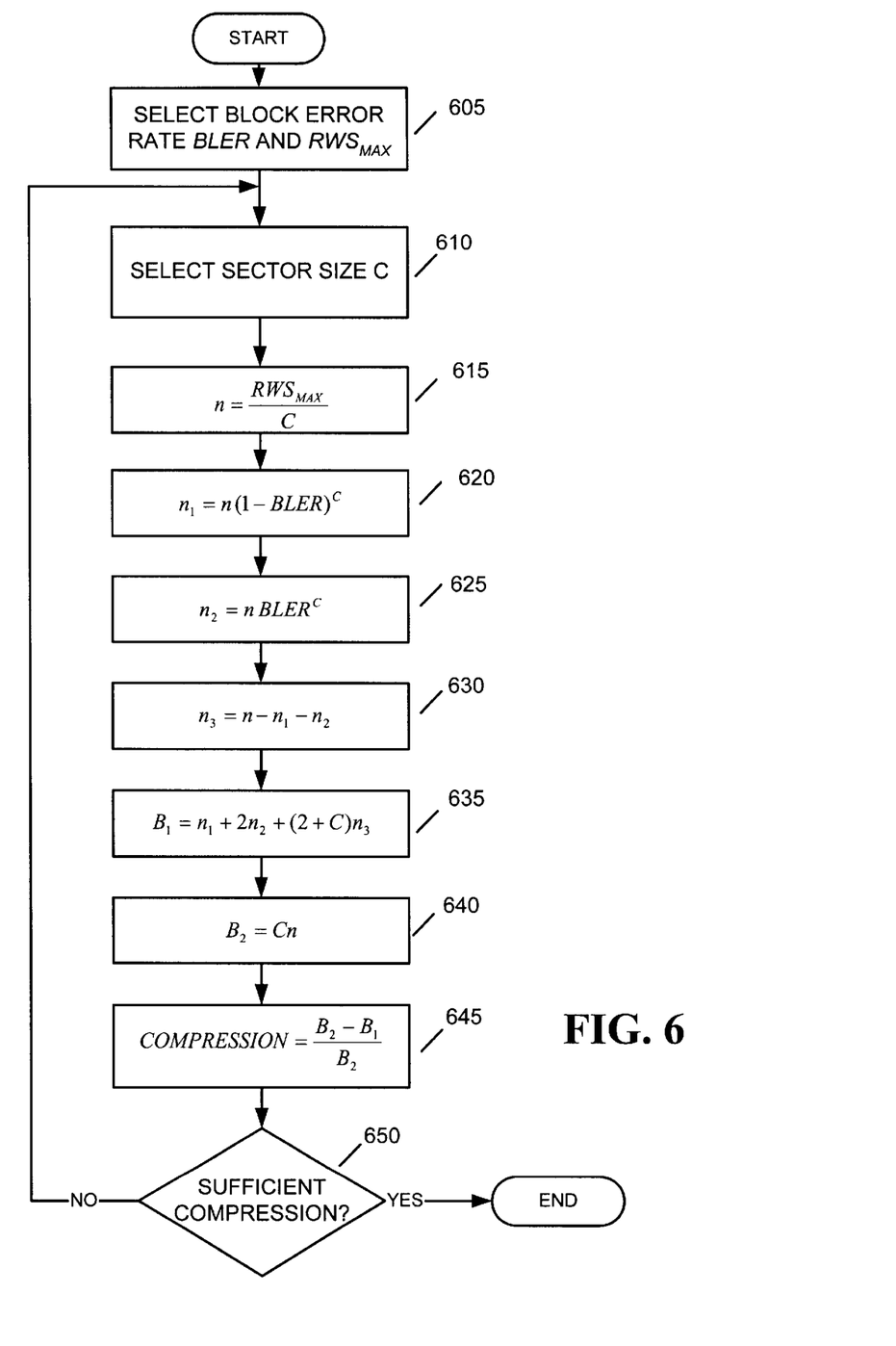
FIG. 6 is a flowchart that illustrates an exemplary receive window sector size selection process consistent with the present invention.

FIG. 6 illustrates an exemplary process, consistent with the invention, for selecting a sector size C for each sector of receive window 305. The sector size C, in combination with the number of sectors n of the receive window and the transmission block error rate (BLER), determines a bitmap compression ratio as compared to a conventional ARQ flat acknowledgement bitmap. The following exemplary process, thus, enables the determination of a desired bitmap compression ratio given a sector size C, a maximum receive window size ($RWS_{MAX}$) and a BLER.

To begin the sector size selection process, a BLER and a $RWS_{MAX}$ are first selected [step 605]. For example, a BLER of 10% (i.e., 0.10) and a $RWS_{MAX}$ of 1024 may be selected. A desired sector size C for each sector in the receive window is further selected [step 610]. For example, a C of 4 data blocks may be selected, as depicted in FIG. 3. The number n of sectors, corresponding to the maximum receive window size $RWS_{MAX}$ and the selected sector size C, can be determined by the following relation [step 615]:

$$n = \frac{RWS_{MAX}}{C} \qquad \text{Eqn.(1)}$$

Given the example values of $RWS_{MAX}$, BLER and C above, the number of sectors n would equal 1024/4, equaling 256. The average number $n_1$ of sectors that can be acknowledged with a single sector ACK bit can be determined by the following relation [step 620]:

$$n_1 = n(1-\text{BLER})^C \qquad \text{Eqn. (2)}$$

Using the example values, $n_1$ would equal $256*(1-0.1)^4$, equaling 167.9616. The average number $n_2$ of sectors that can be negative acknowledged with two bits (one sector ACK bit and one sector NACK bit) can be determined by the following relation [step 625]:

$$n_2 = n\text{BLER}^C \qquad \text{Eqn. (3)}$$

Using the example values $n_2$ would equal $256*(0.1)^4$, equaling 0.0256. The average number $n_3$ of sectors that can be individually ACKed/NACKed can be determined by the following relation [step 630]:

$$n_3 = n - n_1 - n_2 \qquad \text{Eqn. (4)}$$

Therefore, using the example values, $n_3$ would equal 256−167.9616−0.0256, equaling 88.0128. The total number of bits $B_1$ of the hierarchical bitmap may then be determined using the following relation [step 635]:

$$B_1 = n_1 + 2n_2 + (2+C)n_3 \qquad \text{Eqn. (5)}$$

Using the example values, $B_1$ would equal 167.9616+ 2*0.0256+(2+4)*88.0128, equaling 696.0896. As a comparison, the total number $B_2$ of bits of a conventional flat bitmap can be determined using the following relation [step 640]:

$$B_2 = Cn \qquad \text{Eqn. (6)}$$

Using the example values, $B_2$ would equal 4*256, equaling 1024. The bitmap compression ratio (COMPRESSION) of the hierarchical bitmap of the present invention may then be determined using the following relation [step 645]:

$$COMPRESSION = \frac{B_2 - B_1}{B_2} \qquad \text{Eqn.(7)}$$

Using the example values, the bitmap compression equals (1024−696.0896) divided by 1024, equaling 0.32 (or 32%).

If the determined bitmap compression is insufficient for a particular application, then the desired sector size C can be reselected [step 610]. The process depicted in steps 610 through 650 can then be repeated until sufficient bitmap compression is achieved for a particular application.

Using the sector size selection process described above, it can be seen that if the BLER is not very high (e.g., <30%), the bitmap size may be reduced even more if only the sector ACK bit, and not the sector NACK bit, is used in the acknowledgement bitmap. This occurs because, with a BLER smaller than 30%, the number of sector that can be NACKed with only two bits is so small that the additional sector NACK bits are wasted. On the other hand, if the BLER is high (e.g., 50% or higher) and/or block errors occur in bursts, then it can be seen that it is advantageous to keep the sector NACK.

Systems and methods consistent with the present invention, therefore, provide mechanisms for achieving acknowledgement bitmap compression under most channel conditions as compared to conventional flat acknowledgement bitmaps. Bitmap compression can be achieved in the present invention through the collective acknowledgement/negative acknowledgement of consecutive blocks having the same receive status in an ARQ window.

The foregoing description of embodiments of the present invention provides illustration and description, but it is not intended to be exhaustive or to limit the invention to the precise form disclosed. Modifications and variations are possible in light of the above teachings or may be acquired from practice of the invention. For example, the described implementation includes software and hardware, but elements of the present invention may be implemented as a combination of hardware and software, in software alone, or in hardware alone. Also, while series of steps have been described with regard to FIGS. 4–6, the order of the steps may be varied in other implementations consistent with the present invention. No element, step, or instruction used in the description of the present application should be construed as critical or essential to the invention unless explicitly described as such.

The present invention may be embodied as cellular communication systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may include any medium that can contain, store, communicate, propagate, or transport the program for use by, or in connection with, an instruction execution system, apparatus, or device. The computer-usable or computer-readable medium may include, for example but not limited to, an electronic, magnetic, optical, electromagnetic, infrared, or semiconductor system, apparatus, device, or propagation medium.

More specific examples (a non-exhaustive list) of a computer-readable medium would include the following: an electrical connection having one or more wires, a portable computer diskette, a random access memory (RAM), a read-only memory (ROM), a erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

One skilled in the art will recognize that the principles of the present invention may be applied to any wired or wireless system utilizing any type of multi-access scheme, such as TDMA, CDMA or FDMA. It should be further understood that the principles of the present invention may be utilized in hybrid systems that are combinations of two or more of the above multi-access schemes. In addition, a communication device, in accordance with the present invention, may be designed to communicate with, for example, a wireless base station transceiver using any standard based on GSM, TDMA, CDMA, FDMA, a hybrid of such standards or any other standard.

The scope of the invention is defined by the claims and their equivalents.

What is claimed is:

1. A method for communicating data between a transmitting communication device and a receiving communication device, comprising:

specifying a number of data blocks in an ARQ receive window;

dividing the receive window into a number of sectors, each sector comprising a portion of the number of data blocks in the receive window;

receiving, at the receiving communication device, data blocks within the receive window transmitted from the transmitting communication device;

constructing an acknowledgement bitmap for each sector in the receive window, the acknowledgement bitmap comprising a sector acknowledgement bit; and transmitting the acknowledgement bitmap for each sector to the transmitting communication device.

2. The method of claim 1, wherein the acknowledgement bitmap further comprises a sector negative acknowledgement bit.

3. The method of claim 1, wherein the acknowledgement bitmap for each sector further comprises individual acknowledgement bits corresponding to each data block in a sector.

4. The method of claim 1, further comprising:

constructing a hierarchical acknowledgement bitmap comprising the acknowledgement bitmaps for each sector in the receive window; and transmitting the hierarchical acknowledgement bitmap to the transmitting communication device.

5. The method of claim 1, wherein the acknowledgement bitmap for a sector comprises a sector acknowledgement bit when all data blocks in the sector are received by the receiving communication device.

6. The method of claim 5, wherein the sector acknowledgement bit is set to one.

7. The method of claim 1, wherein the acknowledgement bitmap for a sector comprises a sector acknowledgement bit and a sector negative acknowledgement bit when none of the data blocks in the sector are received by the receiving communication device.

8. The method of claim 7, wherein the sector acknowledgement bit is set to zero and the sector negative acknowledgement bit is set to one.

9. The method of claim 1, wherein the acknowledgement bitmap for a sector comprises a sector acknowledgement bit, a sector negative acknowledgement bit, and individual acknowledgement bits corresponding to each data block in the sector when some, but not all, of the data blocks in the sector are received by the receiving communication device.

10. The method of claim 9, wherein the sector acknowledgement bit is set to zero and the sector negative acknowledgement bit is set to zero.

11. The method of claim 10, wherein each individual acknowledgement bit corresponding to a data block in the sector is set to zero when the corresponding data block is not received from the transmitting communication device.

12. The method of claim 10, wherein each individual acknowledgement bit corresponding to a data block in the sector is set to one when the corresponding data block is received from the transmitting communication device.

13. The method of claim 1, wherein the receive window comprises a sliding receive window of an ARQ protocol.

14. A communication device, comprising:
   a processing unit that:
      specifies a number of data blocks in an ARQ receive window,
      divides the receive window into a number of sectors, each sector comprising a portion of the number of data blocks in the receive window,
      receives data blocks within the receive window transmitted from a transmitting communication device, and
      constructs an acknowledgement bitmap for each sector in the receive window, the acknowledgement bitmap comprising a sector acknowledgement bit; and
   a transmitter that:
      transmits the acknowledgement bitmap for each sector to the transmitting communication device.

15. The communication device of claim 14, wherein the acknowledgement bitmap further comprises a sector negative acknowledgement bit.

16. The communication device of claim 14, wherein the acknowledgement bitmap for each sector further comprises individual acknowledgement bits corresponding to each data block in a sector.

17. The communication device of claim 14, wherein the processing unit further:
   constructs a hierarchical acknowledgement bitmap comprising the acknowledgement bitmaps for each sector in the receive window; and the transmitter further:
   transmits the hierarchical acknowledgement bitmap to the transmitting communication device.

18. The communication device of claim 14, wherein the acknowledgement bitmap for a sector comprises a sector acknowledgement bit when all data blocks in the sector are received by the receiving communication device.

19. The communication device of claim 18, wherein the sector acknowledgement bit is set to one.

20. The communication device of claim 14, wherein the acknowledgement bitmap for a sector comprises a sector acknowledgement bit and a sector negative acknowledgement bit when none of the data blocks in the sector are received by the receiving communication device.

21. The communication device of claim 20, wherein the sector acknowledgement bit is set to zero and the sector negative acknowledgement bit is set to one.

22. The communication device of claim 14, wherein the acknowledgement bitmap for a sector comprises a sector acknowledgement bit, a sector negative acknowledgement bit, and individual acknowledgement bits corresponding to each data block in the sector when some, but not all, of the data blocks in the sector are received by the receiving communication device.

23. The communication device of claim 22, wherein the sector acknowledgement bit is set to zero and the sector negative acknowledgement bit is set to zero.

24. The communication device of claim 23, wherein individual acknowledgement bits corresponding to respective data blocks in the sector are set to zero when the corresponding data block is not received from the transmitting communication device.

25. The communication device of claim 23, wherein the individual acknowledgement bits corresponding to respective data blocks in the sector are set to one when the corresponding data block is received from the transmitting communication device.

26. The communication device of claim 14, wherein the receive window comprises a sliding receive window of an ARQ protocol.

27. A computer-readable medium containing instructions for controlling at least one processing unit to perform a method for communicating data between a transmitting communication device and a receiving communication device, the method comprising:
   specifying a number of data blocks in an ARQ receive window;
   dividing the receive window into a number of sectors, each sector comprising a portion of the number of data blocks in the receive window;
   receiving, at the receiving communication device, data blocks within the receive window transmitted from the transmitting communication device;
   constructing an acknowledgement bitmap for each sector in the receive window, the acknowledgement bitmap comprising a sector acknowledgement bit; and
   initiating transmission of the acknowledgement bitmap for each sector to the transmitting communication device.

28. A method for constructing an acknowledgment message in a communication device, comprising:
   dividing an ARQ receive window into a number of sectors, each sector comprising a portion of a number of data blocks in the receive window;
   receiving data blocks within the ARQ receive window; and
   constructing an acknowledgement bitmap for each sector in the receive window, the acknowledgement bitmap comprising a sector acknowledgement bit.

29. A communication device, comprising:
   a processing unit that:

divides an ARQ receive window into a number of sectors, each sector comprising a portion of a number of data blocks in the receive window, receives data blocks within the ARQ receive window, and constructs an acknowledgement bitmap for each sector in the receive window, the acknowledgement bitmap comprising at a sector acknowledgement bit; and a memory that stores the acknowledgement bitmap for each sector.

30. A computer-readable medium containing instructions for controlling at least one processing unit to perform a method for constructing an acknowledgment message in a communication device, the method comprising:

dividing an ARQ receive window into a number of sectors, each sector comprising a portion of a number of data blocks in the receive window;

receiving data blocks within the ARQ receive window; and constructing an acknowledgement bitmap for each sector in the receive window, the acknowledgement bitmap comprising a sector acknowledgement bit.

31. A data structure encoded on a computer readable medium, comprising:

acknowledgement data for acknowledging data blocks received in each sector of an ARQ receive window, each sector comprising a portion of a number of data blocks in the receive window, the acknowledgement data comprising a sector acknowledgement bit.

32. The data structure of claim 31, wherein the acknowledgement bitmap further comprises a sector negative acknowledgement bit.

33. The data structure of claim 31, wherein the acknowledgement data further comprises: individual acknowledgement bits corresponding to each data block in a sector.

34. The data structure of claim 31, wherein the acknowledgement data comprises the sector acknowledgement bit when all data blocks in a sector are received.

35. The data structure of claim 34, wherein the sector acknowledgement bit is set to one.

36. The data structure of claim 31, wherein the acknowledgement data further comprises the sector acknowledgement bit, and individual acknowledgement bits corresponding to each data block in the sector, when all data blocks in the sector are not received.

37. The data structure of claim 36, wherein the sector acknowledgement bit is set to zero.

38. The data structure of claim 31, wherein the acknowledgement data comprises a sector acknowledgement bit, and a sector negative acknowledgement bit, when none of the data blocks in the sector are received.

39. The data structure of claim 38, wherein the sector acknowledgement bit is set to zero and the sector negative acknowledgement bit is set to one.

40. The data structure of claim 31, wherein the acknowledgement data comprises a sector acknowledgement bit, a sector negative acknowledgement bit and block acknowledgement bits corresponding to each data block in the sector when some, but not all, of the data blocks in the sector are received.

41. The data structure of claim 40, wherein the sector acknowledgement bit is set to zero and the sector negative acknowledgement bit is set to zero.

42. The data structure of claim 41, wherein each individual acknowledgement bit corresponding to a data block in the sector is set to zero when the corresponding data block is not received.

43. The data structure of claim 41, wherein each individual acknowledgement bit corresponding to a data block in the sector is set to one when the corresponding block is received.

44. A communication system comprising:

a first communication device that transmits blocks of data in an ARQ send window; and a second communication device that:
specifies a number of data blocks in an ARQ receive window, divides the receive window into a number of sectors, each sector comprising a portion of the number of data blocks in the receive window, receives, within the receive window, the data blocks transmitted from the first communication device, constructs an acknowledgement bitmap for each sector in the receive window, the acknowledgement bitmap comprising a sector acknowledgement bit, and transmits the acknowledgement bitmap for each sector to the first communication device.

45. A method of compressing an acknowledgement bitmap used in an ARQ protocol, comprising:

selecting a size for each sector in an ARQ receive window, each sector comprising a portion of a number of data blocks in the receive window;

constructing a hierarchical acknowledgement bitmap for each sector in the receive window, the hierarchical acknowledgement bitmap comprising a sector acknowledgement bit;

determining a bit compression of a total acknowledgement bitmap comprising the hierarchical bitmaps for each sector in the receive window; and if the bit compression, of the total acknowledgement bitmap is not sufficient, re-selecting the size for each sector of the receive window.

* * * * *